April 28, 1964     W. HOCHWALD ETAL     3,131,336
COMPENSATED TRANSDUCER

Filed July 13, 1960     2 Sheets-Sheet 1

INVENTORS
WALTER HOCHWALD
JEFF N. SCHMIDT
BY Allan Rothenberg
ATTORNEY

April 28, 1964     W. HOCHWALD ETAL     3,131,336
COMPENSATED TRANSDUCER

Filed July 13, 1960     2 Sheets-Sheet 2

(a) SET (b) RESET (c) F.F.

(a) SET (b) RESET (c) F.F.

INVENTORS
WALTER HOCHWALD
JEFF N. SCHMIDT
BY Allan Rothenberg
ATTORNEY

United States Patent Office 3,131,336
Patented Apr. 28, 1964

3,131,336
COMPENSATED TRANSDUCER
Walter Hochwald and Jeff N. Schmidt, Downey, Calif., assignors to North American Aviation, Inc.
Filed July 13, 1960, Ser. No. 42,527
12 Claims. (Cl. 317—155.5)

This invention concerns electrically operated transducers and more particularly relates to such transducers which are operated in response to an electrical signal of nominally fixed amplitude. The invention is of particular utility when applied as a torquer in instruments of a stable platform or other type of inertial navigation system.

A typical stable platform embodies a number of gyros and acceleration sensitive devices such as accelerometers, velocity or distance meters. The gyros are utilized to provide a reference attitude and since they tend to remain fixed in spaced rather than fixedly oriented relative to the earth, the gyros must be torqued so as to cause their reference axes to precess at a desired rate. For example, a gyro which is not moving with respect to the earth must be torqued so that its reference axis will rotate at earth rate and thus remain fixedly related to the earth. The present invention may be utilized to apply such torques to a gyro.

In certain types of acceleration sensing devices a force balance system is utilized wherein the displacement of a pendulous mass under acceleration is sensed by a suitable pickoff and fed back to restore the mass to null position by means of an appropriate servo system. The servo system restores the mass to null by applying a torque thereto which is substantially equal and opposite to the inertial force exerted by sensed acceleration. The invention is useful as the torquer of such an accelerometer.

Inertial navigation systems typically embody computers for calculating, among other things, the necessary correction torques for the instruments. A digital computer used to compute gyro torques will provide an output in the form of a train of pulses whereas the typical electromagnetic gyro torquer requires an analogue input thereto. Thus a form of digital-to-analogue conversion circuit is needed between the computer and torquer. Such a conversion circuit may employ a current of precisely controlled fixed amplitude from a high precision current source. The applied torque is varied by utilizing positive or negative pulses of fixed amplitude current of duration or pulse width which is determined by the output of the digital computer. The required current source precision in such conversion circuit is a great disadvantage and introduces many sources of error into the system. In such an arrangement a highly accurate voltage reference must be established in order to maintain the desired scale factor accuracy. Additionally, precision resistors are utilized to transform accurate voltages into currents. This necessitates the use of a temperature stabilized container or oven which must be controlled to avoid temperature variations of greater than 0.5° C. In view of the high system environmental temperatures, the temperature must normally be regulated at about 80° C. in order to maintain control. This not only causes large power dissipation but also forces operation of the precision resistors and zener voltage references at a temperature which is not necessarily the most desirable for greatest precision.

A commonly used gyro torquer embodies a permanent magnet and an armature coil. The torquing currents are fed to the armature coil such that the resulting torque is equal to the product of magnetic field of the permanent magnet and the magnetic field created by the armature coil. Thus it will be seen that torquing accuracy depends upon two factors. First, the precision of the permanent magnet field, and, second, the precision voltage reference in the torquing circuitry.

It is an object of this invention to decrease the required precision of the signal reference source. The invention effectively eliminates the need for a voltage reference of high accuracy by providing compensation such that scale factor precision of the torquing currents need be maintained to semi-precise values only. For example, the error due to current variations of ±0.5 percent is effectively reduced by the compensating arrangement of this invention so as to enable retention of a desired overall torquing accuracy of 0.001 percent.

In carrying out the invention according to a preferred embodiment thereof there are provided two transducers each responsive to a signal source. The first transducer provides an output which is a substantially linear function of the signal from the source, while the output of the second transducer is a function of the square of the source signal. The two outputs are differentially combined such that the combined output will have, at a particular operating point thereof, a zero rate of change of torque with respect to change of signal from the source. More particularly, the conventional permanent magnet and armature coil torquer is opposed by an electromagnet and armature coil torquer with the two armature coils receiving the same current which is switched according to the computer output. The field coil of the electromagnet receives the same current as do the two armature coils but the current in the former is not switched. With this arrangement it will be seen that the torque in the permanent magnet torquer is precisely proportional to the current I, while the torque due to the electromagnet torquer is precisely proportional to the square of current. The two torquers are differentially combined such that a variation in the current from a predetermined quiescent value thereof within certain limits will effect a substantially decreased variation in torque from the combined torquers.

It is an object of this invention to provide an improved transducer which is compensated for input signal variation.

A further object of the invention is the attainment of a high precision torque while utilizing a reference signal source of considerably less precision.

Still another object is to ease the tolerances required of the current source used in certain conversion circuitry.

A further object of the invention is to provide a pulse width torquer wherein variation of input current will have but a minimum effect upon output torque.

These and other objects of the invention will become apparent from the following description taken in connection with the accompanying drawings in which:

FIG. 1 illustrates a compensated torquer constructed according to the principles of this invention;

FIG. 2 comprises a graphical illustration of the principles of this invention;

In the drawings like reference characters refer to like parts.

The invention will be first described on the assumption that a variable torque is not required. Such an arrangement is desirable for some systems wherein a gyro is to be torqued solely for earth rate and is to be maintained at launch point level as described, for example, in Patent No. 2,933,267 to John M. Slater et al. for Gyroscopically Stabilized Navigation Reference Device.

Figure 1:
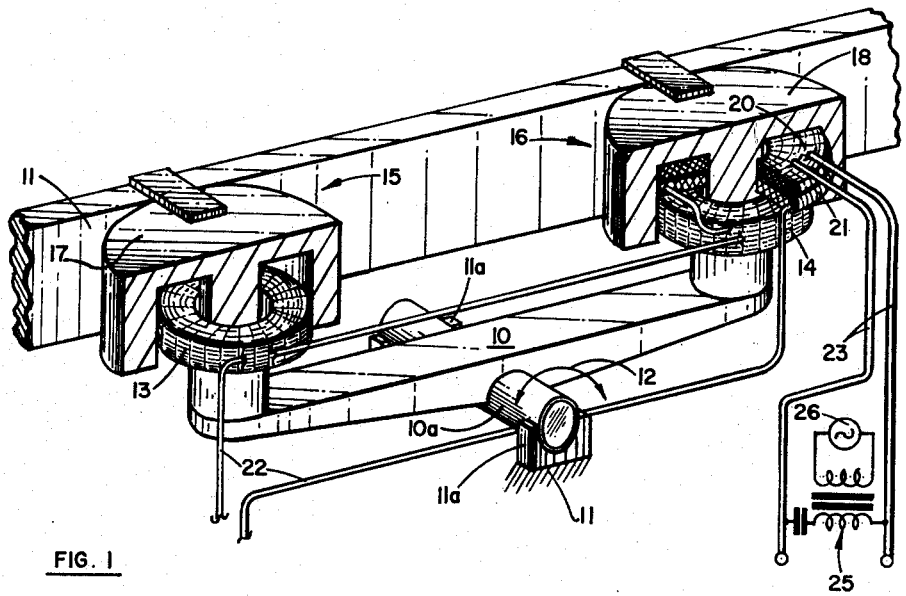

As illustrated in FIG. 1, a first member 10 which is pivotally mounted to a second member 11 for limited rotational motion in the direction of arrows 12 carries the armature coils 13 and 14 of a pair of electromagnetic transducers or torquers 15, 16, respectively. The pivotal mount is depicted as comprising a shaft 10a fixed to member 10 and journaled in bearings 11a which are fixed to the member 11 by means of structure not shown. Each transducer includes a magnet part 17, 18, respectively, which are both affixed to the part 11 in which the armature coils are pivoted. Thus both armature coils are fixedly secured to each other and both magnet parts are fixedly secured to each other whereby the armature coils move as a unit relative to the magnet parts. Each transducer exerts a force on member 10 which tends to rotate the latter relative to member 11 about the axis of the journal. Since both transducers exert their forces on the same members, their outputs are combined. In the present arrangement the forces exerted are mutually opposed whereby the combination of forces is differential.

In the case of transducer 15 the magnet 17 is a permanent magnet of the requisite precision. Magnet part 18 of transducer 16 is an electromagnet including a core of soft iron and a field coil 20. An armature reaction coil 21 is also wound upon the core of transducer 16.

The armature coils 13, 14 are connected in series with a source of current by means of a pair of electrical leads 22. The field coil 20 is connected to the same source by leads 23. The current is of a fixed amplitude and for the purposes of the present discussion (assuming a fixed torque is desired) may be considered to be continuous direct current whereby a continuous precision torque of fixed and predetermined magnitude will be provided. The current through the armature coils is fed in series with the coil 21. This armature reaction coil 21 is utilized to prevent armature reaction in the electromagnetic torquer and is therefore polarized to tend to buck out or oppose the armature coil field. The ampere turns of the reaction coil 21 should be preferably one-half the ampere turns of the armature coil 14. The field (in the soft iron core of the electromagnet) with which the armature field coacts is a function of both the flux due to the field coil and of a flux component due to the armature coil itself. The effect of the latter flux component is substantially eliminated by the use of the reaction coil 21 which bucks out one-half of this armature coil flux component. The ampere turns of armature coils 13 and 14 in the illustrated embodiment are preferably the same as are the moment arms of the two, although other arrangements of magnet field and moment arm relations will be apparent to those skilled in the art.

The two armature coils and the field coil of the two transducers are polarized such that the action of the electromagnetic torquer 16 opposes that of the permanent magnet torquer 15. With this arrangement the outputs of the two transducers are differentially combined.

If deemed necessary or desirable in certain situations an alternating current field of small magnitude may be introduced into the electromagnet by means of a transformer 25 having a primary winding connected to a source 26 of, for example, 400 cycles per second and a secondary winding series capacitatively connected across the leads 23 to the field coil 20. This small A.-C. field in the electromagnet will prevent operation on a minor hysteresis loop for changes in the value of current I.

With the several coils fed with a substantially constant current I the total torque T exerted upon the member 10 relative to the member 11 is $$T = K_1 I_1 (B - K_2 I_2) = K_1 I_1 B - K_1 K_2 I_1 I_2 \quad (1)$$

where B equals the flux density of the permanent magnet, $K_1 I_1$ equals the flux density of the armature coil winding and $K_2 I_2$ equals the flux density of the electromagnet. The effect of armature reaction winding 21 is to make $K_2$ substantially constant. $I_1$ and $I_2$ have substantially the same magnitude so that $I_2 = |I_1| = |I|$. Rewriting Equation 1, $T = K_1 I B - K_1 K_2 I |I|$. Taking the partial derivative of torque with respect to current we get $$\frac{\partial T}{\partial I} = K_1 B - 2 K_1 K_2 |I_1| \quad (2)$$

For complete compensation it is necessary that the above partial derivative equal zero; hence $$K_1 B - 2 K_1 K_2 |I| = 0 \quad (3)$$

and $$|I_0| = \frac{B}{2 K_2} \quad (4)$$

Figure 2:
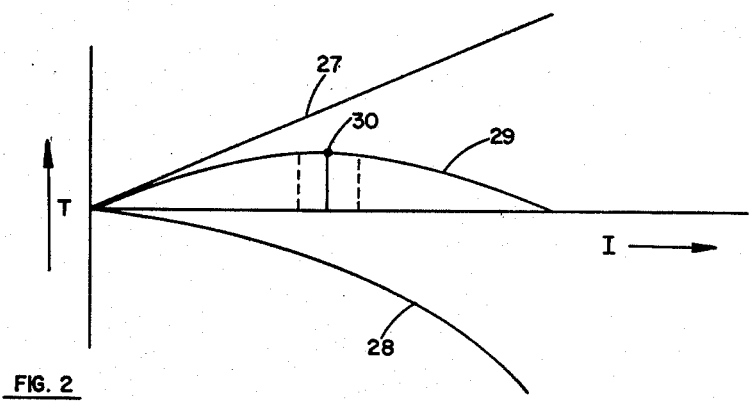

A graphical representation of the result of this analysis is illustrated in FIG. 2 which comprises a plot of total torque T plotted vertically against current $|I|$ plotted horizontally. The curve 27 represents the torque versus current curve of the permanent magnet, while the curve 28 represents the curve of the electromagnet. When combined the two yield the net torque versus current curve indicated at 29.

Since the total torque T results from the differential combination of a first order term in I and a second order term in I, there exists a value of I, namely $I_0$ (which may be termed a quiescent value of I), at which the slopes of the two terms are equal. The slopes are, at all points, opposite in sign. At the point 30 where $I = I_0$, the net curve 29 has zero slope, indicating that the rate of change of torque with respect to change in current is zero. For all practical purposes there exists a small finite region above and below the quiescent value $I_0$ for which the torque T is substantially independent of changes in I.

Figure 3:
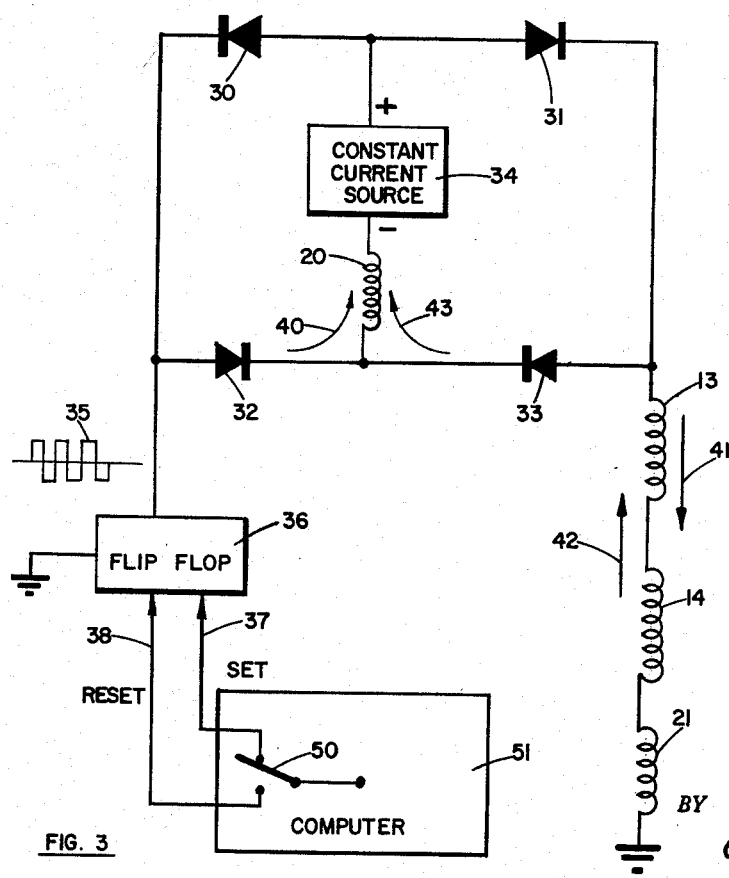
FIG. 3 illustrates an exemplary torquer driving circuit.

Illustrated in FIG. 3 is the circuitry for producing a variable torque by means of the described compensated torquer. The two armature coils 13 and 14 are series connected with the armature reaction coil 21 to ground. The current for these coils is derived from a switching circuit comprising diodes, 30, 31, 32, and 33, together with a source of constant current 34, all connected as illustrated. The electromagnet field coil 20 is connected between one terminal of the source 34 and the common connection of the diodes 32 and 33. A switching signal 35 is provided from the output of a bistable multivibrator or flip-flop 36 which is controlled to be in one or the other of its two states by the appearance of a set or reset pulse on one or the other of flip-flop input lines 37, 38. With the flip-flop in one condition and the output thereof positive, for example, diode 30 is back-biased to cut off, and the current conducted through diode 32 flows through field coil 20 in the direction of arrow 40 to the constant current source and thence through diode 31 to ground through coils 13, 14 and 21 in the direction of arrow 41. With the flip-flop 36 in its other state producing negative output, current is conducted in the direction of arrow 42 from ground through coils 21, 14 and 13 through diode 33 and through coil 20 in the direction of arrow 43 to source 34. Thence the flow is through diode 30 and back to ground through the flip-flop. The current amplitude remains fixed within the limits of precision of the constant current source. It is to be noted that the current in armature coils 13 and 14 reverse as indicated by arrows 41 and 42 when the flip-flop output reverses polarity. On the other hand, the current through the field coil 20 as indicated by arrows 40 and 43 remains in the same direction regardless of flip-flop output polarity.

Figure 4:
FIGS. 4 and 5 are synchrographs illustrating the operation of the circuit of FIG. 3.
Figure 4:
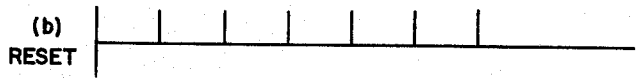
Figure 4:
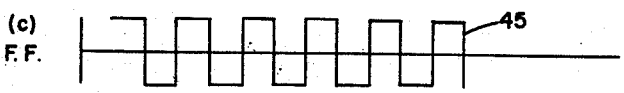

If pulses appear alternately at fixed prescribed intervals on set and reset lines 37 and 38 of the flip-flop (FIGS. 4a and 4b), the output is a symmetrical square wave as illustrated at 45 in FIG. 4c. With this arrangement, the current to the armature coils reverses repetitively at equal intervals whereby total torque over a finite interval of time is zero. Note that the field coil current does not reverse. With current in the armature coils of a first sense, each transducer exerts a force (in mutual opposition) in a given direction. Since as illustrated in FIG. 2, for example, the force of transducer 15 is the greater, the net torque has the sense of this greater torque. When the current reverses, the force exerted by both transducers reverses. The net torque still has the sense of the greater torque of transducer 15 which sense has reversed. Therefore, reversal of current effects reversal of net torque whereby the sum of the equal number of positive and negative torque increments is zero. For maximum torque of one sense the flip-flop will be placed in one condition, the set condition for example, and remain there, whereby the current from the constant current source flows in unchanging direction through all of the torquer coils. Similarly, for maximum torque of opposite sense the flip-flop is placed in reset condition and remains there.

Figure 5:
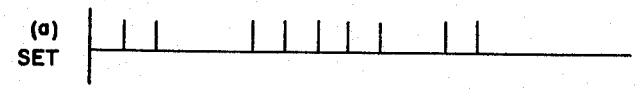
Figure 5:
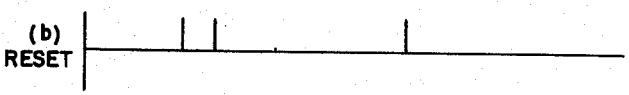
Figure 5:
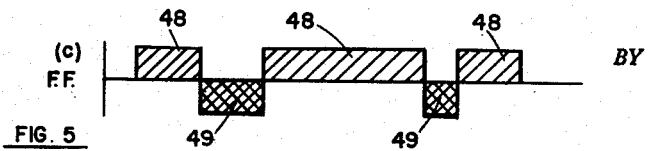

The magnitude and direction of the applied torque may be precisely controlled by control of a switch 50 which supplies the set and reset pulses to the flip-flop. By choosing a greater number of set than reset pulses over any given interval of time, there will be provided a total torque of one sense which is precisely proportional to the difference in the number of set and reset pulses over such interval of time, assuming a fixed pulse interval. Thus, for example, if the set and reset pulses are chosen as shown in FIGS. 5a and 5b, the flip-flop output will appear as indicated in FIG. 5c. The shaded areas above the reference line in FIG. 5c indicate the application of armature coil current of one sense, whereas the cross-hatched areas below the horizontal line in FIG. 5c represent armature coil current of opposite sense. The commanded torque over the illustrated time interval, time being applied horizontally in these graphs, would be precisely proportional to the difference between the total of positive current pulses 48 and negative current pulses 49. It will be seen that this difference is equal to the difference in the number of set pulses and the number of reset pulses as illustrated in FIGS. 5a and 5b. From one point of view the described flip-flop may be deemed to be analogous to a pulse width modulator since its output comprises pulses of variable duration. It is understood, however, that the modulation is of an incremental nature since the pulse width can vary only by intervals equal to an integral multiple of the period between consecutive pulses.

For the purposes of the present invention the switch 50 may be operated by any suitable means and provide pulses from a conventional pulse generator. However, it will be readily understood by those skilled in the art that the switch 50 is but a functional representation of the output of a conventional digital computer 51 which may comprise a fundamental part of an inertial system. The computer computes the desired torques according to the various factors such as earth rate, range angle, and the like, and provides output pulses on either set or reset lines 37, 38, such that the difference between the number of pulses on each line represents the computed torque. Calling the computed torque C (e.g., $C$=the difference between total set and reset times of the flip-flop over a finite time), it will be seen that Equation 1 now becomes:

$$T = CK_1 IB - CK_1 K_2 I^2 \qquad (5)$$

and that Equation 3 becomes:

$$CK_1 B - 2CK_1 K_2 I = 0 \qquad (6)$$

whereby it will be noted that the compensation achieved is completely independent of the computed torque magnitude.

To illustrate the improvements in allowable precision achieved by the means of the present invention, we shall now consider a numerical example. Assume that the absolute current magnitude is held to only ±0.5 percent or one part in 200. Then $$I_0 = \frac{B}{2K_2}\left(1 \pm \frac{1}{200}\right) \qquad (7)$$

$$T = \frac{CK_1}{2K_2}B^2\left(1 \pm \frac{1}{200}\right) - \frac{CK_1 B^2}{4K_2}\left(1 \pm \frac{1}{200}\right)^2 \qquad (8)$$

$$T = \frac{CK_1 B^2}{4K_2}\left(1 - \frac{1}{40,000}\right) \qquad (9)$$

It will be seen that the error produced by the variations of $I$ from the quiescent value of $I_0$ over a range of ±0.5 percent will produce a maximum torque error of negative 0.0025 percent. A general equation for a maximum error resulting from a given variation of $I$ can be derived:

Maximum torque error in percent $$= -\frac{1}{100}\text{ (percent error in } I)^2$$
$$(10)$$

Figure 6:
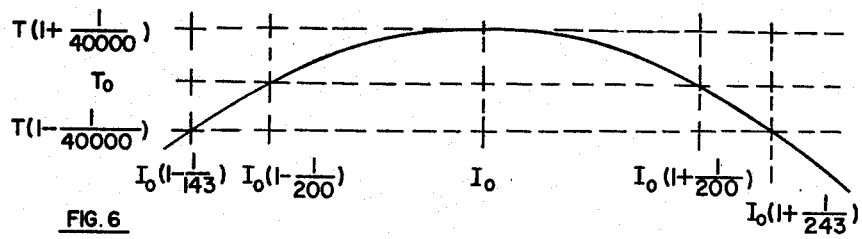
FIG. 6 is a graph illustrating an additional aspect of the improvement achieved by the present invention.

It will be noted that the error is always negative. Since this is so, the initial scale factor for T can be chosen as illustrated in FIG. 6 so that, at the exact quiescent value of current $I_0$, the desired torque $T_0$ is less than the actual torque T. In other words, for the example given above, the scale factor is so chosen that $$T_0 = T\left(1 - \frac{1}{40,000}\right)$$

With such an arrangement and since $I$ can be expected to frequently vary from the chosen value of $I_0$ (within limits of the current source precision), the actual torque T will generally be less than that computed for a value of current equal to $I_0$. This results in a further increase in an allowable lack of precision of $I$, whereby a percent change of current $I$ of ±0.7 will result in torque errors of less than about ±0.0025 percent.

It will be seen that the described embodiment of the compensated transducer of the present invention greatly decreases the required precision of the constant current source, such as source 34 of FIG. 3, while still maintaining requisite torquing precision. By reducing the required high current scale factor of precision, the need for temperature control of zener voltage reference and resistors in the conversion circuitry is eliminated. No highly accurate scale factor adjustment or measurement of torquing currents is required in field use. Since torquing scale factor depends entirely on the permanent magnet and the physical characteristics of the electromagnetic torquer, it is possible in the use of the present invention to set the torquing scale factor of each gyro in the factory. Assuming no permanent magnet changes, the scale factor would be maintained despite interchanging of external circuitry. Further, the compensated torquing circuitry illustrated in FIG. 3 is quite simple, thus facilitating packaging and minimizing space requirements.

The invention has been specifically described in connection with an electro-magnetic torquer. However, it will readily be appreciated that the principle of mutually opposing different functions of a reference signal for compensation may be applied to other types of system. For example the electret (see F. Gutmann, Review of Modern Physics, vol. 20, p. 457, 1948), is the electrostatic analogue of the permanent magnet and thus may be employed as one portion of a compensated electrostatic transducer following the teaching set forth herein.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A compensated transducing system comprising control means for generating a control signal of predetermined substantially fixed nominal amplitude, and transducing means responsive to said signal for generating a force which decreases when said signal amplitude varies in either sense from said nominal amplitude, said transducing means comprising first and second transducers providing mutually opposing and unequal force components each of which varies with signal amplitude variation.

2. A compensated system comprising a source of signal, first transducing means responsive to said source for providing a first output which is a substantially linear function of the signal from said source, second transducing means responsive to said source for providing a second output which is a function of the square of said signal, and means for differentially combining said outputs, whereby the combined outputs are compensated for variations of said signal source.

3. A compensated system comprising a source of signal of variable pulse width and substantially fixed amplitude, first electromagnetic means responsive to said source for providing a first force component which is a substantially linear function of the amplitude of signal from said source, second electromagnetic means responsive to said source for providing a second force component which is a function of the square of the amplitude of the signal from said source, and means for differentially combining said force components.

4. A compensated force producing system comprising a source of signal, a substantially linear force producing means responsive to said signal for producing a first force component, a second force producing means for producing a second force component according to the square of said signal, said force components being of opposite sense, and means for combining said force components.

5. A compensated force producing system comprising means for generating a pulsed signal of substantially constant amplitude and of selectively variable pulse width and polarity, a force producing means responsive to said signal for producing a first force component which varies according to a first function of said signal amplitude, a second force producing means for producing a second force component which varies according to a second function of said signal amplitude, said force components being of opposite sense, means for combining said force components to generate a net force whose rate of change with respect to the amplitude of said signal is substantially zero and whose average sense depends upon the predominant polarity of said signal.

6. A compensated transducer system comprising a first transducer having a permanent magnet part and a first armature coil, a second transducer having an electromagnet part and a second armature coil, an armature reaction coil on the magnet part of at least said second transducer, said magnet parts being secured together and said armature coils being mechanically secured together, said coils being poled to cause the forces of said transducers to oppose each other, and means for energizing said coils with a current of substantially fixed amplitude to generate a net force whose rate of change with respect to the amplitude of said current is substantially zero and whose average sense depends upon the predominant direction of said current.

7. A compensated transducer system for use with a source of current of variable pulse width and substantially constant magnitude comprising: a first transducer having a permanent magnet part and an armature coil, a second transducer having a magnet part and an armature coil, a field coil on the magnet part of the second transducer, said magnet parts being secured together and said armature coils being secured together, said coils being poled to cause said transducers to oppose each other, means for energizing said field coil from said source with current of a predetermined polarity, and means for energizing both said armature coils from said source with current of selectively reversible polarity.

8. A compensated transducing system comprising control means for generating pulses of predetermined substantially fixed nominal amplitude and selectively varying duration, and transducing means responsive to said pulses for generating a force which decreases when said pulse amplitude varies in either sense from said nominal amplitude, said transducing means comprising first and second transducers providing mutually opposing and unequal force components each of which varies with pulse amplitude variation.

9. In combination: a first transducer having a permanent magnet part and an armature coil; a second transducer having an electromagnet part and an armature coil; a field coil and an armature reaction coil on said magnet part of said second transducer, said magnet parts being mechanically and rigidly connected together and said armature coils being rigidly attached together, said coils being poled to cause said transducers to oppose each other; means for energizing said field coil from said source with current of a predetermined polarity and means for energizing both said armature coils and said armature reaction coil from said source with current of selectively reversible polarity.

10. In combination: a first and a second transducer, each said transducer having a first element which is stationary and a second element which is movable, one of said elements of said first transducer having a permanent magnet and the other of said elements of said first transducer having an armature coil, one of the elements of said second transducer having an electromagnet including a field coil and an armature reaction coil and the other of said elements of said second transducer having an armature coil; a mechanical linkage connecting said movable elements of said first and second transducers, said coils being poled to cause said transducers to oppose each other; a source of current of variable pulse width and substantially constant magnitude; means for energizing said field coil from said source with current of a predetermined flow direction; and means for energizing both of said armature coils and said armature reaction coil from said source with current of selectively reversible direction.

11. A device as recited in claim 10 in which said field coil is connected in series with said current source to cause current continuously to flow in the same direction through said field coil and in which said means for energizing said armature coils and said armature reaction coil is a switching means connected between said constant current source and said armature coils and armature reaction coil to cause current to alternate in the direction and to vary in time of flow to apply to said mechanical linkage a net force whose rate of change with respect to amplitude of said signal is substantially zero and whose average sense depends upon the predominate direction of flow of current through said armature coils and said armature reaction coil.

12. A device as recited in claim 11 in which said first transducer generates a force which is a substantially linear function of the amplitude of the flow of current of said source and the force generated by said second transducer is a function of the square of the amplitude of the flow of current from said source.

References Cited in the file of this patent

UNITED STATES PATENTS

| | | |
|---|---|---|
| 2,794,157 | Chisholm | May 28, 1957 |
| 2,795,143 | Hammond | June 11, 1957 |
| 2,822,694 | McKenney | Feb. 11, 1958 |
| 2,886,768 | Minder | May 12, 1959 |
| 3,019,374 | Ladd | Jan. 30, 1962 |